(12) United States Patent
Matsumiya et al.

(10) Patent No.: US 7,721,455 B2
(45) Date of Patent: May 25, 2010

(54) MEASURING INSTRUMENT

(75) Inventors: Sadayuki Matsumiya, Kawasaki (JP); Mikio Suzuki, Nakatsugawa (JP); Shuji Hayashida, Kawasaki (JP); Yoshiaki Shiraishi, Kawasaki (JP); Nobuyuki Hayashi, Kawasaki (JP)

(73) Assignee: Mitutoyo Corporation, Kawasaki-shi (JP)

( * ) Notice: Subject to any disclaimer, the term of this patent is extended or adjusted under 35 U.S.C. 154(b) by 81 days.

(21) Appl. No.: 12/289,684

(22) Filed: Oct. 31, 2008

(65) Prior Publication Data
US 2009/0113734 A1 May 7, 2009

(30) Foreign Application Priority Data
Nov. 5, 2007 (JP) .............................. 2007-287563

(51) Int. Cl.
G01B 7/02 (2006.01)
(52) U.S. Cl. .......................................... 33/505; 33/783
(58) Field of Classification Search ................... 33/505, 33/706, 707, 708, 783, 784, 792, 795, 813
See application file for complete search history.

(56) References Cited

U.S. PATENT DOCUMENTS

| | | | | |
|---|---|---|---|---|
| 4,229,883 A * | 10/1980 | Kobashi | ....................... | 33/784 |
| 4,289,382 A | 9/1981 | Clark | | |
| 4,399,613 A * | 8/1983 | Nishikata et al. | .............. | 33/784 |
| 4,612,656 A * | 9/1986 | Suzuki et al. | .................. | 33/784 |
| 5,056,238 A * | 10/1991 | Chi | .............................. | 33/783 |
| 6,412,187 B1* | 7/2002 | Sasaki et al. | ................... | 33/784 |
| 7,530,177 B1* | 5/2009 | Meichle et al. | ............... | 33/708 |
| 2003/0217478 A1* | 11/2003 | Matsumiya et al. | ............ | 33/784 |
| 2008/0184582 A1* | 8/2008 | Kim | ............................. | 33/784 |
| 2009/0235546 A1* | 9/2009 | Klepp | .......................... | 33/502 |
| 2009/0248352 A1* | 10/2009 | Hirobe et al. | ............. | 33/355 R |

FOREIGN PATENT DOCUMENTS

| | | |
|---|---|---|
| EP | 0 031 716 A1 | 7/1981 |
| EP | 1 022 539 A2 | 7/2000 |
| JP | U-55-103513 | 7/1980 |
| JP | A-59-075111 | 4/1984 |
| JP | A-06-288701 | 10/1994 |
| JP | A-06-300551 | 10/1994 |
| JP | A-08-240447 | 9/1996 |
| JP | B2-2572149 | 10/1996 |
| JP | A-09-005117 | 1/1997 |

(Continued)

*Primary Examiner*—G. Bradley Bennett
(74) *Attorney, Agent, or Firm*—Oliff & Berridge, PLC (57) ABSTRACT

A measuring instrument includes a detector that outputs a measured value, a digital display unit, an analog display unit having a plurality of display segments, and a display controller. The display controller includes: a tolerance range display unit that lights or blinks display segments corresponding to a preset tolerance range relative to a preset value; a first determiner that obtains a difference between the present value and a present measured value and determines whether the difference is within an analog display range wider than the tolerance range; a difference display unit that lights a display segment corresponding to the last one or the last two digits of the present measured value when the first determiner determines that the difference is within the analog display range; a second determiner that determines whether the difference is within the tolerance range; and an acceptance or rejection display unit that displays a result determined by the second determiner.

4 Claims, 10 Drawing Sheets

FOREIGN PATENT DOCUMENTS

| | | |
|---|---|---|
| JP | A-09-049723 | 2/1997 |
| JP | A-10-142001 | 5/1998 |
| JP | A-2000-205852 | 7/2000 |
| JP | A-2002-122446 | 4/2002 |
| JP | B2-333812 | 7/2002 |
| JP | B2-3351848 | 9/2002 |
| JP | B2-3372793 | 11/2002 |
| JP | A-2002-365038 | 12/2002 |
| JP | B2-3382993 | 12/2002 |
| JP | B2-3386725 | 1/2003 |
| JP | B2-3472107 | 9/2003 |
| JP | A-2007-064798 | 3/2007 |

* cited by examiner

MEASURING INSTRUMENT

BACKGROUND OF THE INVENTION

1. Field of the Invention

The present invention relates to a measuring instrument that detects a measured value as an electric signal and displays the measured value. More particularly, the present invention relates to a measuring instrument that detects the measured value and determines acceptance or rejection based on whether or not the measured value is within a preset tolerance range. Such a measuring instrument is applicable to a caliper gauge, a dial gauge and the like.

2. Description of Related Art

As such a dial gauge, there has been known an analog dial gauge in which a linear displacement of a spindle is converted into a rotational movement of an indicator through a movement conversion mechanism, an expansion mechanism or the like so as to read a measured value from a scale corresponding to the indicator, and a digital dial gauge in which an encoder is accommodated for detecting a liner displacement of a spindle as an electric signal so as to digitally display a measured value detected by the encoder.

The digital dial gauge is typically used when a high resolution, high accuracy and readability are required, which causes an economic burden, while the analog dial gauge is typically used when the high accuracy is not required. Also, the latter dial gauge is often used when acceptance or rejection is determined based on whether a measured value is within a predetermined range such as a tolerance.

However, in actual measurement, one of the dial gauges cannot be easily selected depending on an object to be measured, a measurement property, user's proficiency level or custom, and the like. Consequently, a dial gauge having both features of the digital dial gauge and the analog dial gauge has been required.

For example, in order to numerically check a deviation of a rejected measured value, the feature of the digital dial gauge needs to be added to the analog dial gauge used for determining acceptance when a measured value is within a tolerance range. Also, the feature of the analog dial gauge needs to be added to the digital dial gauge in order to roughly check a trend in a measured value without reading a digitally displayed value that instantly changes until a final value is determined.

Accordingly, there has been known a measuring instrument called as a digital and analog caliper gauge in which the two dial gauges are combined as disclosed in Document 1 (JP-A-06-288701).

The digital and analog caliper gauge includes a digital display for displaying measured data as a five-digit numerical value at a central position of a display surface of a slider, and an analog display for displaying the last two digits of the numerical value displayed on the digital display, the analog display surrounding the digital display. The analog display includes 100 display segments each having a predetermined width and length arranged at equal intervals on a circumference encircling the digital display, and displays the last two digits by controlling lighting of a single display segment corresponding to the measured value.

In the measuring instrument disclosed in Document 1, the measured value detected by the encoder is digitally displayed as a numerical value on the digital display, and the last two digits of the numerical value are displayed as a point on the analog display. Accordingly, three display segments are lighted at the same time. Namely, a display segment corresponding to the last two digits, a prior display segment thereto, and a subsequent display segment thereto are lighted at the same time.

Since the consecutive three display segments including the display segment corresponding to the last two digits of the measured value are lighted at the same time when the slider remains stationary, the lighted display segments can be visually checked easily.

However, the last two digits of the measured value instantly change when the slider moves. Accordingly, the display segments to be lighted on the analog display are changed at high speed and consequently blinking lights circularly move at high speed. At this time, the last two digits are not easily checked visually and considerable electric power consumption is required.

SUMMARY OF THE INVENTION

An object of the invention is to provide a measuring instrument including a digital display and an analog display, the measuring instrument made capable of enhancing visibility of the analog display and reducing electric power consumption.

A measuring instrument according to an aspect of the invention includes: a detector that outputs a measured value as an electric signal; a digital display unit; an analog display unit in which a plurality of display segments are disposed at equal intervals in an encircling belt; and a display controller that displays the measured value detected by the detector on the digital display unit and the analog display unit, in which the display controller includes: a tolerance range display unit that lights or blinks display segments corresponding to a preset tolerance range relative to a preset value; a first determiner that obtains a difference between a preset value and a present measured value, and determines whether the difference is within an analog display range wider than the tolerance range; a difference display unit that lights a display segment corresponding to last one or last two digits of the present measured value when the first determiner determines that the difference is within the analog display range; a second determiner that determines whether the difference is within the tolerance range; and an acceptance or rejection display unit that displays a result determined by the second determiner.

According to the aspect of the invention, the display segments corresponding to the preset tolerance range relative to the preset value are lighted or blinked by the tolerance range display unit while the difference between the preset value and the present measured value is obtained and whether or not the difference is within the analog display range wider than the tolerance range is determined. When the difference is within the analog display range, the display segment corresponding to the last one digit or the last two digits of the present measured value is lighted.

Accordingly, when the difference between the preset value and the present measured value is within the analog display range, the display segment corresponding to the last one digit or the last two digits of the present measured value is lighted. Therefore, a position of the present measured value relative to the tolerance range can be visually checked by the display segment of the analog display. Additionally, since the display segment of the analog display is not lighted until the difference between the preset value and the present measured value is within the analog display range, visibility of the analog display can be enhanced and electric power consumption can be reduced.

Then, whether or not the difference between the preset value and the present measured value is within the tolerance range is determined and a result of the determination is displayed. Therefore, it can be checked whether or not the present measured value is within the tolerance range.

The analog display range may be set to correspond to one encircling circumferential length or several encircling circumferential lengths of the analog display unit.

Since the analog display range is set to correspond to one encircling circumferential length or several encircling circumferential lengths of the analog display unit, the display segment of the analog display is not lighted until the present measured value becomes close to the preset value. Therefore, visibility of the analog display can be enhanced and electric power consumption can be reduced.

The analog display unit may include 100 display segments arranged at equal intervals on an encircling circumference thereof so as to display two digits after decimal point of the present measured value.

In this arrangement, for instance, the measured value can be displayed by a 1/100 mm unit when one encircling circumferential length indicates 1 mm. Further, the display segment of the analog display is lighted from when the difference between the present measured value and the preset value is 1 mm or so, which allows an appropriate display.

The digital display unit may include a first digital display unit that displays the measured value as a numerical value and a second digital display unit that displays a difference between the present measured value and the preset value as a numerical value.

Since the digital display unit includes not only the first digital display unit that displays the measured value as the numerical value, but also the second digital display unit that displays the difference between the present measured value and the preset value as the numerical value. Therefore, the difference between the preset value and the present measured value can be checked as a numerical value.

DETAILED DESCRIPTION OF PREFERRED EMBODIMENT(S)

An exemplary embodiment of a measuring instrument according to the invention applied to a caliper gauge will be described below with reference to the attached drawings.

Figure 1:
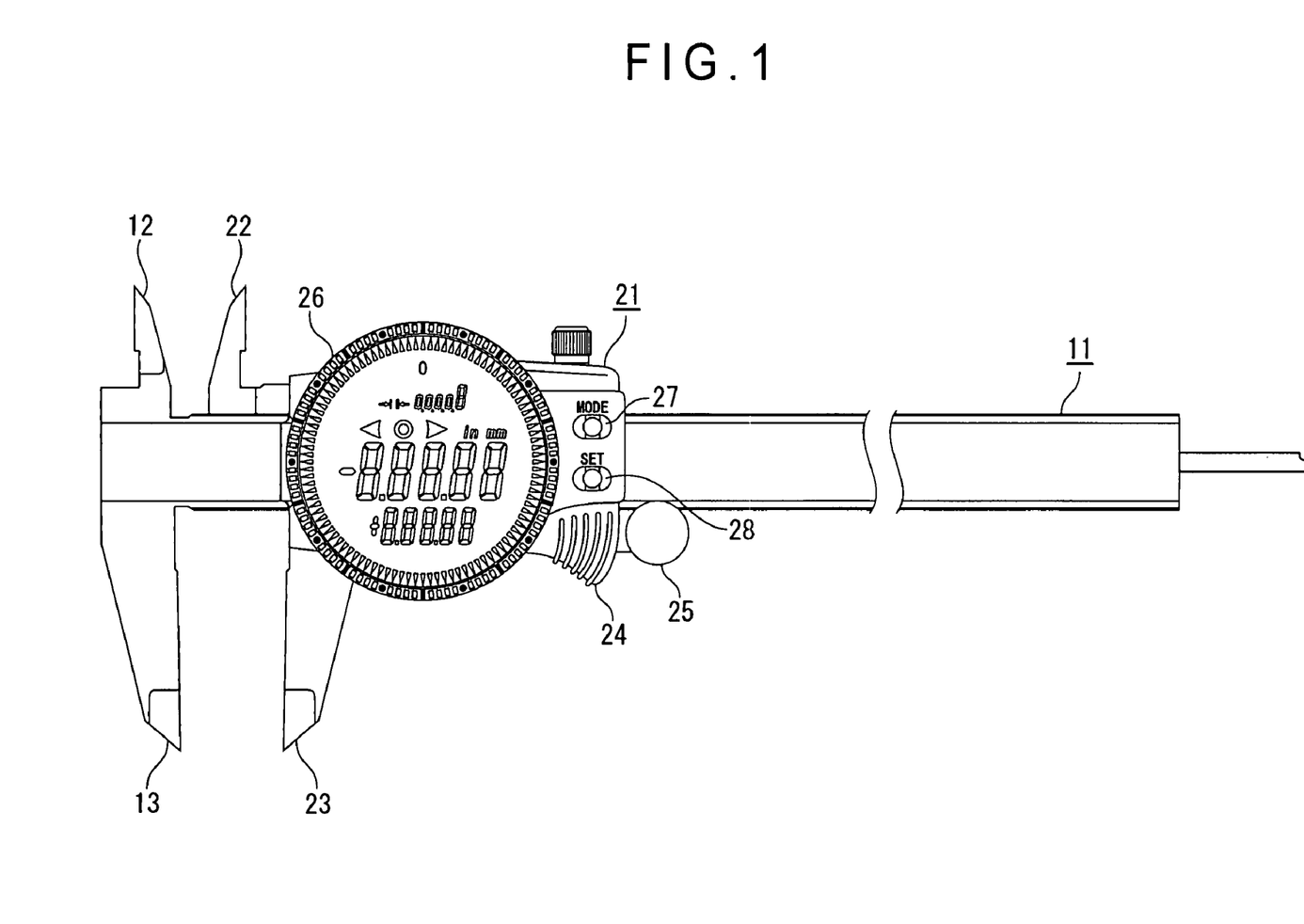
FIG. 1 is a front view illustrating a caliper gauge according to an exemplary embodiment.

FIG. 1 is a front view illustrating the caliper gauge according to the exemplary embodiment. In FIG. 1, a main scale 11 is a fixed member and a slider 21 is a movable member that is movable in a longitudinal direction of the main scale 11.

The main scale ii is integrated with an inner jaw 12 and an outer jaw 13 on a longitudinal end.

The slider 21 is integrated with an inner jaw 22 and an outer jaw 23 on the longitudinal end. The inner jaw 22 and the inner jaw 12 of the main scale 11 contact an inner side of an object to be measured, and the outer jaw 23 and the outer jaw 13 contact an outer side of the object to be measured. The slider 21 is also provided with a finger rest 24 and a feed roller 25 on a lower periphery thereof, and a circular display device 26, a mode switch 27, and a set switch 28 in a front portion thereof.

Figure 2:
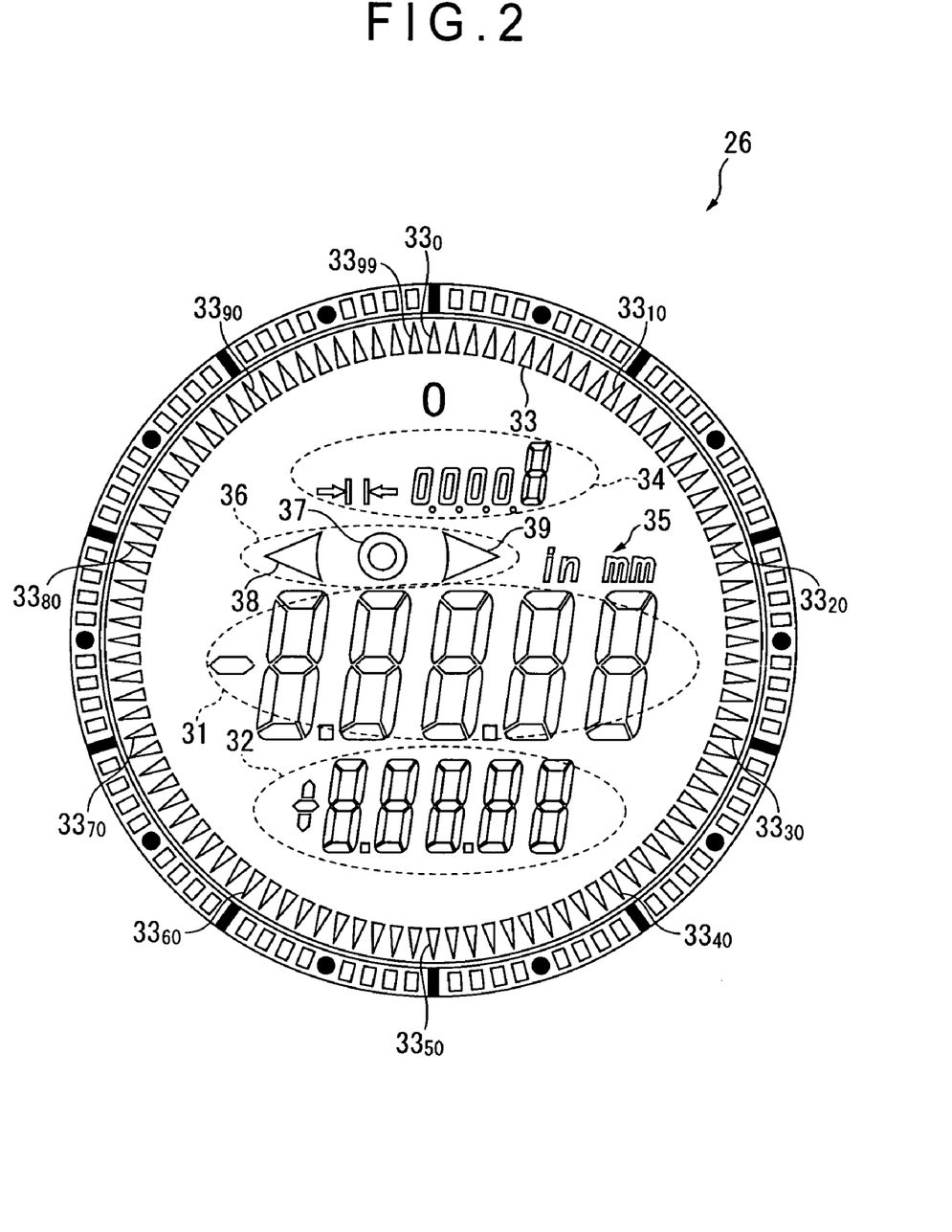
FIG. 2 is a front view illustrating a display device according to the exemplary embodiment.

FIG. 2 illustrates the display device 26. The display device 26 includes a first digital display 31 and a second digital display 32 in a front internal portion thereof. The first digital display 31 displays a measured value (a present measured value) as a five-digit numerical value at a central portion of the front internal portion, and the second digital display 32 displays a difference between the present measured value and a preset value as a five-digit numerical value. The display device 26 also includes an analog display 33 as an analog display unit in which 100 stick-shaped display segments $33_0$-$33_{99}$ are arranged at equal intervals in an encircling belt that encircles the digital displays 31 and 32. The analog display 33 has 100 display segments $33_0$-$33_{99}$ arranged at equal intervals on the encircling belt to display two digits after the decimal point of the present measured value. A digital display unit is defined by the first digital display 31 and the second digital display 32.

An analog bar resolution display 34, a unit display 35 and a tolerance determination result display 36 between the first digital display 31 and the analog display 33. The analog bar resolution display 34 displays a resolution per one scale of the analog display 33, the unit display 35 displays either inch or millimeter, and the tolerance determination result display 36 displays a tolerance determination result.

The tolerance determination result display 36 includes an acceptance display segment 37 that is blinked or lighted when a measured value is within a tolerance range and rejection display segments 38 and 39 that are blinked or lighted when the measured value is smaller than the lower limit value in the tolerance range or larger than the upper limit value in the tolerance range.

Figure 3:
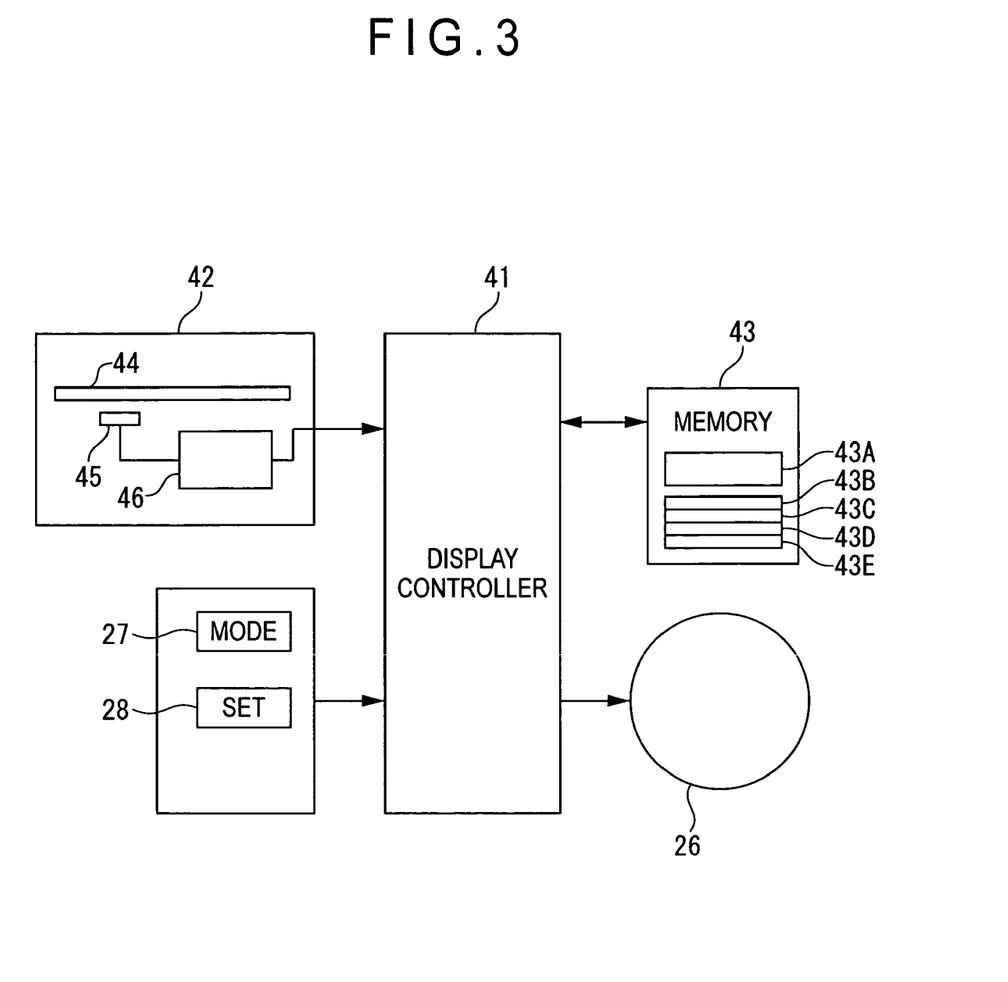
FIG. 3 is a block diagram illustrating a control circuit according to the exemplary embodiment.

FIG. 3 is a block diagram illustrating a control circuit. In FIG. 3, though not illustrated, a display controller 41 includes a CPU, and a ROM that memorizes a processing program.

Switches 27 and 28, the various displays 31, 32, 33, 34, 35, 36, 37, 38 and 39 included in the display device 26, an encoder 42 as a detector that detects a measured value as an electric signal based on a displacement of the slider 21 relative to the main scale 11, and a memory 43 that memorizes a measured value, a preset value, and upper and lower limit values that decides a tolerance range are respectively connected to the display controller 41.

The display controller 41 includes: a present value display unit that digitally displays a present measured value detected by the encoder 42 on the first digital display 31 as a numerical value and displays the last two digits of the numerical value as a point on the analog display 33; a tolerance range display unit that lights or blinks a display segment corresponding a tolerance range that is preliminarily set relative to a preset value; a first determiner that obtains a difference between the preset value and the present measured value and determines whether or not the difference is within an analog display range that is larger than the tolerance range; a difference display unit that lights a display segment corresponding to the last one digit or the last two digits of the present measured value when the first determiner determines that the difference is within the analog display range; a second determiner that determines whether the difference is within the tolerance range; and an acceptance or rejection display unit that displays a result determined by the second determiner.

At this time, the analog display range is set to correspond to lengths of two encircling circumferences on the analog display 33, the two encircling circumferences including a prior encircling circumference and a subsequent encircling circumference relative to the preset value.

The encoder 42 includes: a receiving terminal plate 44 that has a receiving terminal and a coupled terminal along the longitudinal direction of the main scale 11; a transmitting terminal plate 45 that is provided on the slider 21 at a constant interval from the receiving terminal plate 44 and has a plurality of transmitting terminals and an output terminal along a movable direction of the slider 21; and a signal detection processing circuit 46 that applies an alternating voltage having a different phase to the respective transmitting terminals while obtaining a displacement of the slider 21 by obtaining an electrostatic capacitance signal induced by the receiving terminal through the coupled terminal and the output terminal.

The memory 43 includes: a measured value storage 43A that stores a measured value; a preset value storage 43B, an upper limit value storage 43C and a lower limit value storage 43D that respectively store a preset value, an upper limit value, and a lower limit value which are inputted in a later-described tolerance set mode; and an analog-display-range upper and lower limit values storage 43E that stores an upper limit value and a lower limit value in an analog display range.

Next, process of the exemplary embodiment will be described with reference to flow charts illustrated in FIGS. 4 to 6 and examples illustrated in FIGS. 7 to 13. When power is firstly turned on, a present value display mode is set. When the mode switch 27 is pressed in the present value display mode, the present value display mode is shifted to a tolerance set mode or a tolerance determination mode.

Present Value Display Mode

Figure 4:
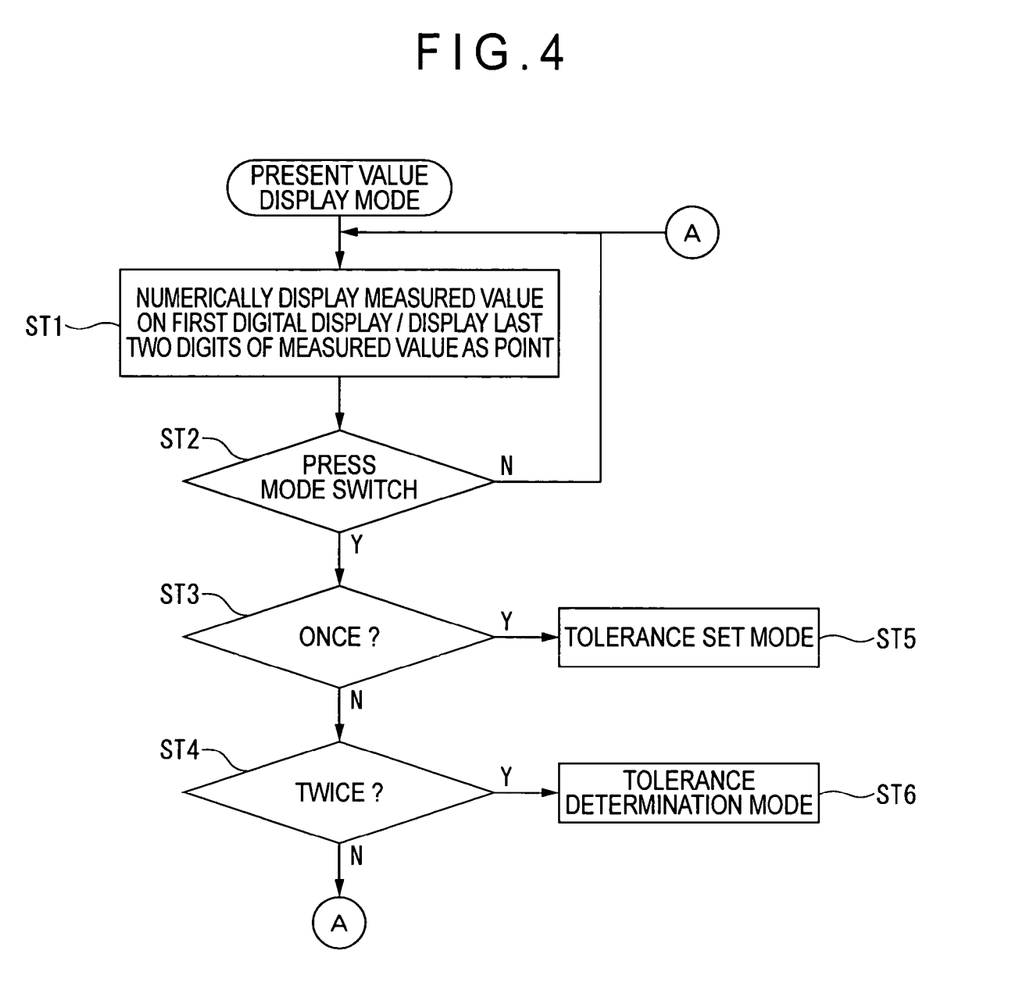
FIG. 4 is a flow chart illustrating a process in a present value display mode according to the exemplary embodiment.
Figure 7:
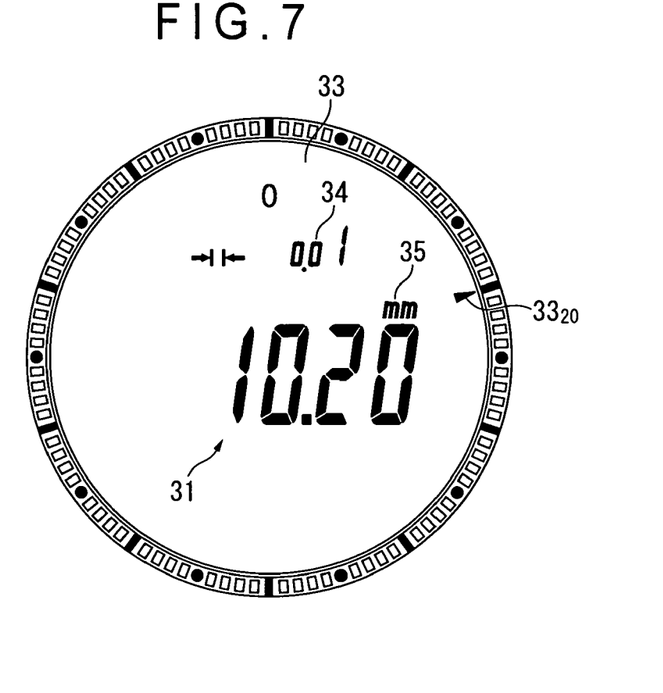
FIG. 7 illustrates the display device displaying a present measured value in the present value display mode according to the exemplary embodiment.
Figure 8:
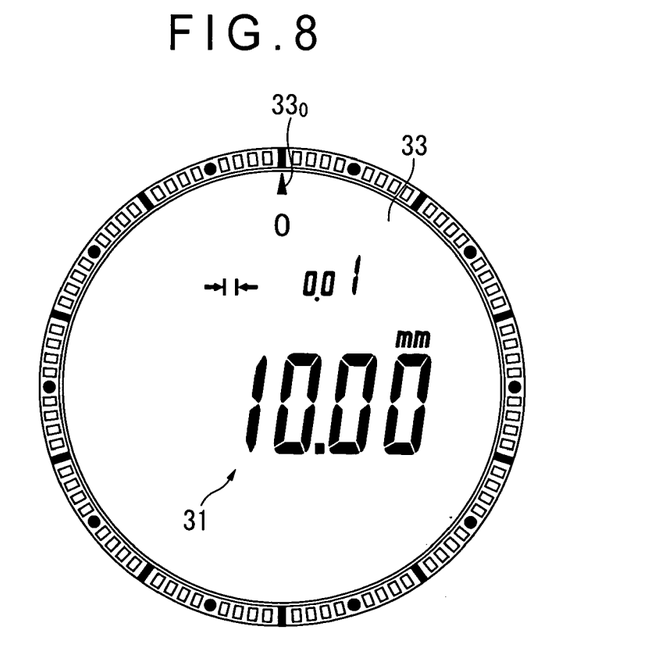
FIG. 8 illustrates the display device when a preset value is set in the tolerance set mode according to the exemplary embodiment.
Figure 9:
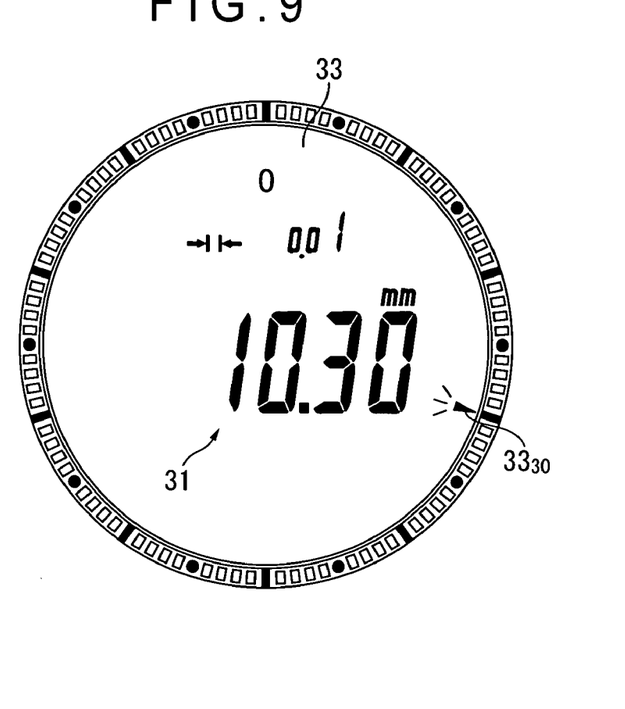
FIG. 9 illustrates the display device when an upper limit value is set in the tolerance set mode according to the exemplary embodiment.
Figure 10:
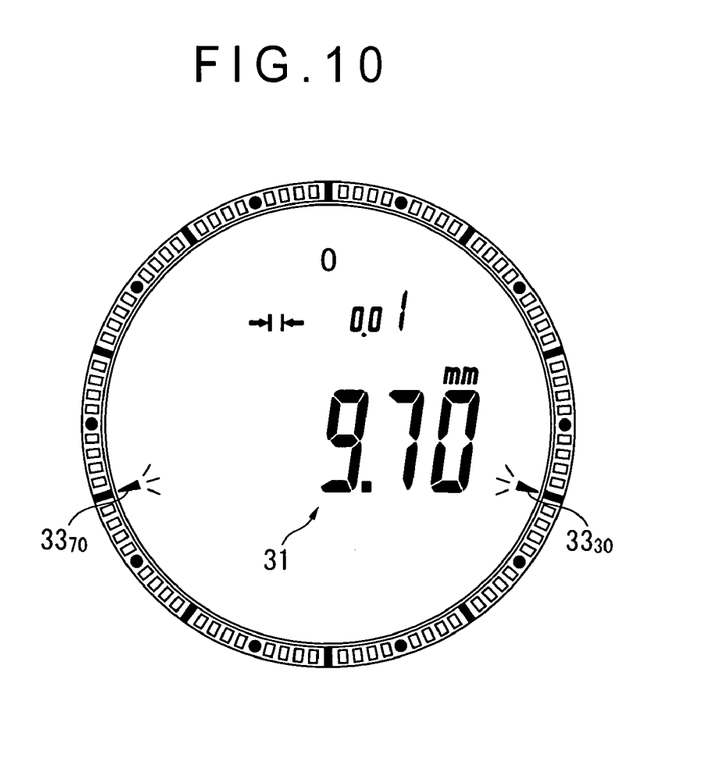
FIG. 10 illustrates the display device when a lower limit value is set in the tolerance set mode according to the exemplary embodiment.

In the present value display mode, a process is executed in accordance with the flow chart illustrated in FIG. 4. In a step (hereinafter referred to as ST) 1, the display controller 41 digitally displays the measured value (the present measured value) detected by the encoder 42 on the first digital display 31 as a numerical value, and displays the last two digits of the numerical value as a point on the analog display 33. For example, as shown in FIG. 7, the display segment $33_{20}$ corresponding to the last two digits of the present measured value displayed on the first digital display 31 is lighted. At this time, "in" indicating inch or "mm" indicating millimeter is lighted on the unit display 35.

In ST 2, ST 3, and ST 4, the process repeatedly returns to ST 1 while it is checked how many times the mode switch 27 is pressed in a predetermined time. When the mode switch 27 is pressed once during ST 2 and ST 3, the process proceeds to ST 5 to execute the tolerance set mode. When the mode switch 27 is pressed twice during ST 2 to ST 4, the process proceeds to ST 6 to execute the tolerance determination mode. Accordingly, the present value display mode is continued unless the mode switch 27 is pressed.

Tolerance Set Mode

Figure 5:
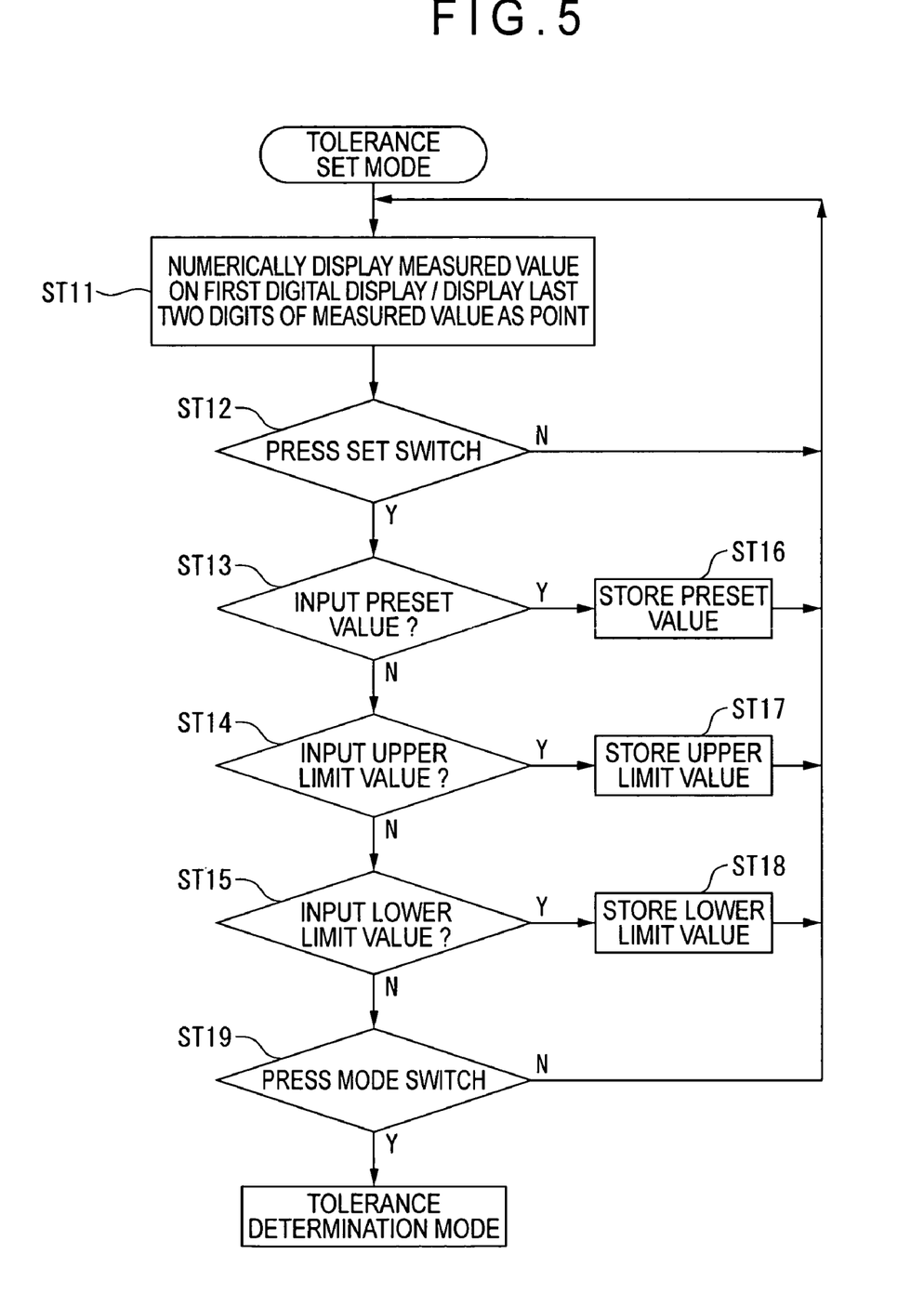
FIG. 5 is a flow chart illustrating a process in a tolerance set mode according to the exemplary embodiment.

In the tolerance set mode, a process is executed in accordance with the flow chart illustrated in FIG. 5. The display controller 41 executes the same process in ST 11 as in ST 1, and then checks whether the set switch 28 is turned on in ST 12. When the set switch 28 is not turned on, the process returns to ST 11.

When the set switch 28 is turned on, it is determined whether a preset value, an upper limit value and a lower limit value need to be inputted respectively in ST 13, ST 14 and ST 15. This determination is made based on whether or not the preset value storage 43B, the upper limit value storage 43C, and the lower limit value storage 43D in the memory 43 store data.

When the preset value needs to be inputted, i.e., when any value is not stored in the storages 43B, 43C, and 43D, the process proceeds to ST 16 to store the preset value in the preset value storage 43B. When the upper limit value needs to be inputted, i.e., when only the preset value of the preset value storage 43B is stored, the process proceeds to ST 17 to store the upper limit value in the upper limit value storage 43C. When the lower limit value needs to be inputted, i.e., when the preset value and the upper limit value are stored in the preset value storage 43B and the upper limit value storage 43C, the process proceeds to ST 18 to store the lower limit value in the lower limit value storage 43D. After all values are inputted, the process proceeds to execute the tolerance determination mode by pressing the mode switch 26 in ST 19.

Accordingly, when the set switch 28 is pressed under such a condition that the slider 21 is moved along the main scale 11 and an arbitrary preset value is displayed on the first digital display 31 and the analog display 33 (for example, FIG. 8), a displayed value "10.00" is stored in the preset value storage 43B.

Also, when the set switch 28 is pressed under such a condition that an arbitrary upper limit value is displayed on the first digital display 31 and the analog display 33 (for example, FIG. 9), a displayed value "10.30" is stored in the upper limit value storage 43C. At this time, the display segment $33_{30}$ of the analog display 33 corresponding to the displayed value is blinked.

When the set switch 28 is pressed under such a condition that an arbitrary lower limit value is displayed on the first digital display 31 and the analog display 33 (for example, FIG. 10), a displayed value "9.70" is stored in the lower limit value storage 43D. At this time, the display segment $33_{70}$ of the analog display 33 corresponding to the displayed value is blinked.

As described above, the preset value, the upper limit value and the lower limit value are respectively stored in the preset value storage 43B, the upper limit value storage 43C, and the lower limit value storage 43D. Subsequently, the process proceeds to execute the tolerance determination mode.

The values stored in the storages can be deleted by a switch or the like (not shown). Then, the above-described process can be executed again to store a new preset value, a new upper limit value, and a new lower limit value in the preset value storage 43B, the upper limit value storage 43C, and the lower limit value storage 43D.

Tolerance Determination Mode

Figure 6:
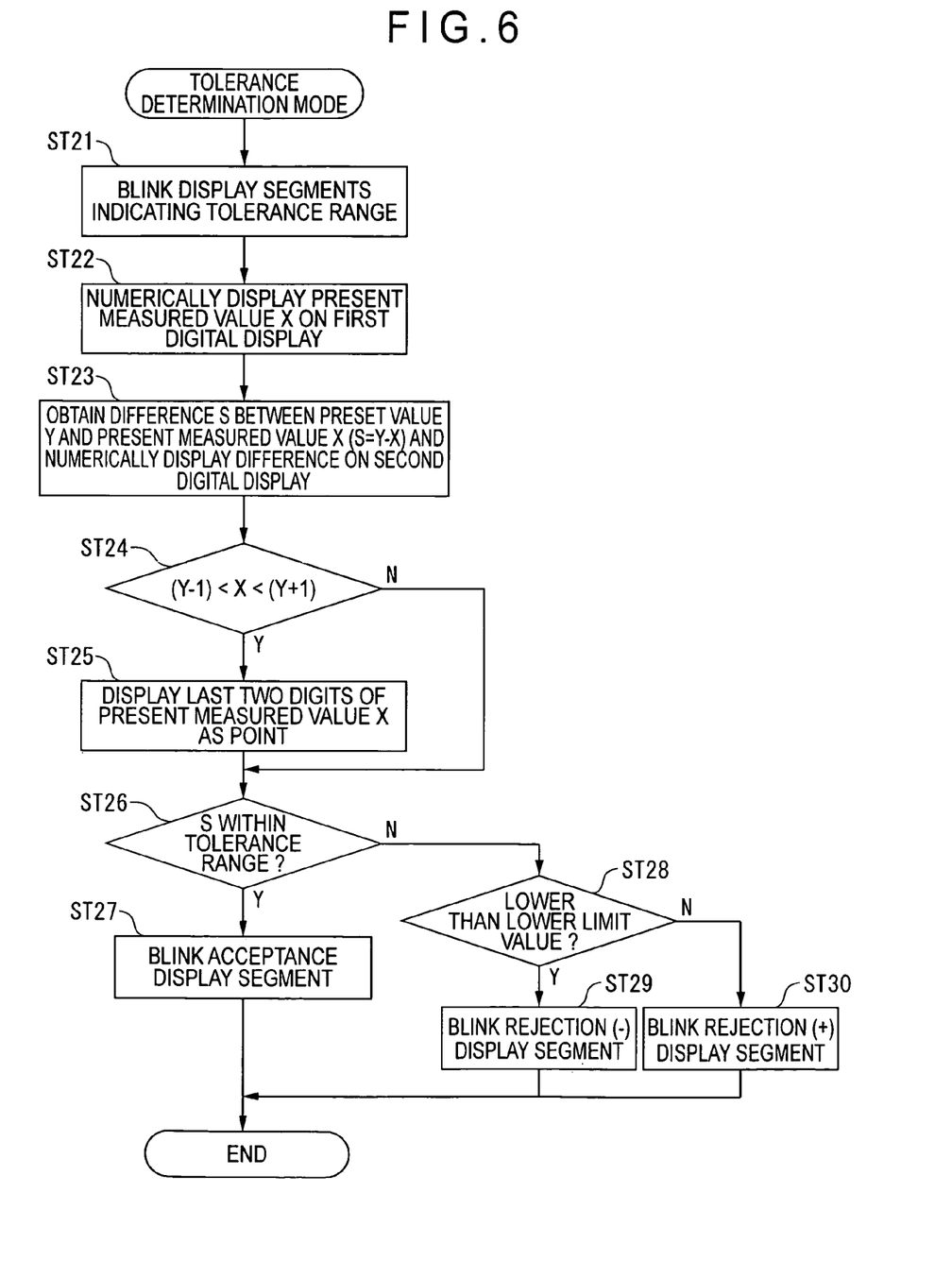
FIG. 6 is a flow chart illustrating a process in a tolerance determination mode according to the exemplary embodiment.

In the tolerance determination mode, a process is executed in accordance with the flow chart illustrated in FIG. 6. The display controller 41 blinks the two display segments indicating a tolerance range, i.e., corresponding to the upper limit value and the lower limit value, in ST 21.

Subsequently, the process proceeds to ST 22 to display a present measured value X on the first digital display 31 as a numerical value. Then, in ST 23, a difference S between the present measured value X and a preset value Y (S=Y−X) is obtained and displayed on the second digital display 32 as a numerical value.

Next, in ST 24, it is determined whether the difference S is within the analog display range which is larger than the tolerance range (i.e., a range between the lower limit value and the upper limit value). In other words, whether the present measured value X is within the range between a smaller value than the lower limit value and a larger value than the upper limit value is determined. In this exemplary embodiment, for instance, a difference between the preset value and the upper and lower limit values is smaller than 1 mm. In this instance, it is determined whether the present measured value X is between a 1 mm smaller value than the preset value Y and a 1 mm larger value than the preset value Y. In other words, it is determined whether an expression (Y−1)≦X≦(Y+1) works out.

Figure 11:
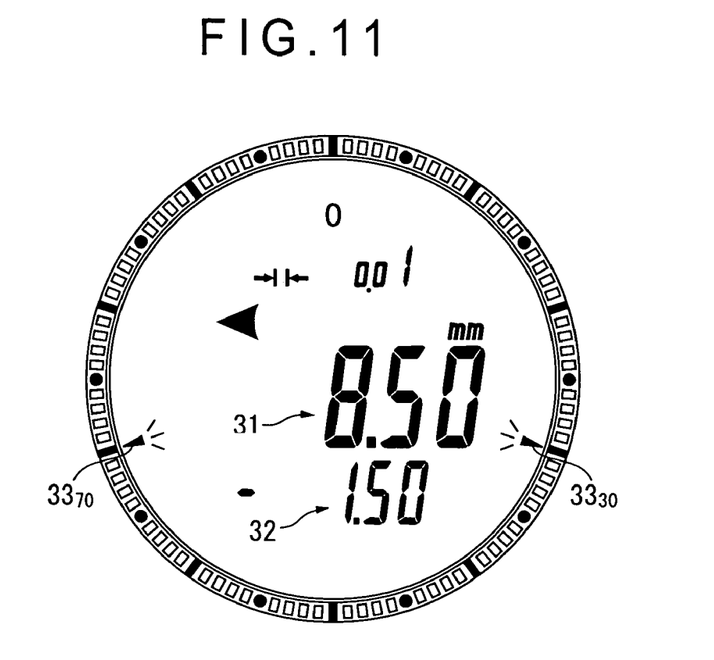
FIG. 11 illustrates the display device when a present measured value is lower than an analog display range in the tolerance determination mode according to the exemplary embodiment.
Figure 12:
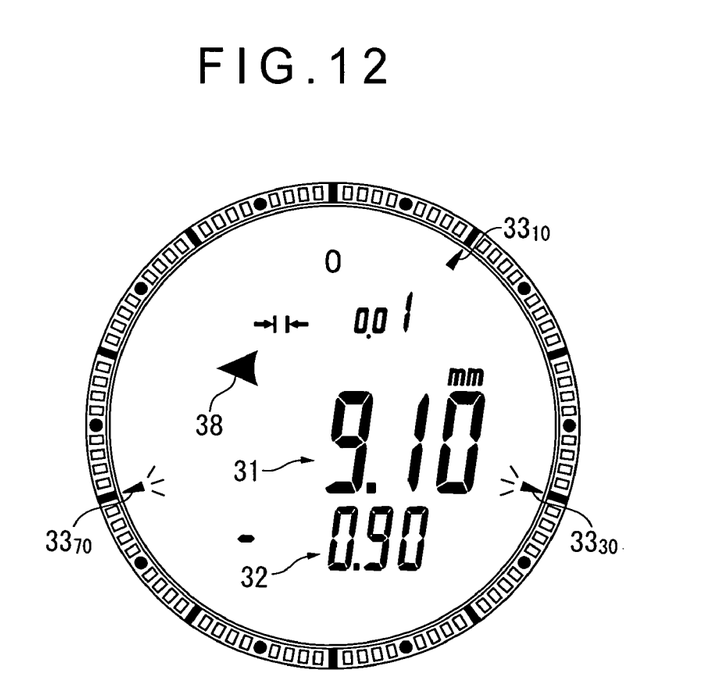
FIG. 12 illustrates the display device when a present measured value is within the analog display range in the tolerance determination mode according to the exemplary embodiment.

When it is determined that the difference S is within the analog display range, the last two digits of the present measured value X are displayed as a point on the analog display 33 in ST 25. When it is determined that the difference S is not within the analog display range as the result, the process proceeds to ST 26 for determining the tolerance without executing the process in ST 25. Accordingly, when the difference S is not within the analog display range, the last two digits of the difference S are not displayed on the analog display 33 as shown in FIG. 11. Therefore, visibility is not lowered by blinking of the display and electricity may be saved. When the difference S is within the analog display range, the last two digits of the present measured value X are displayed as a point on the analog display 33 (i.e., the display segment 33$_{10}$ is lighted) as shown in FIG. 12.

Figure 13:
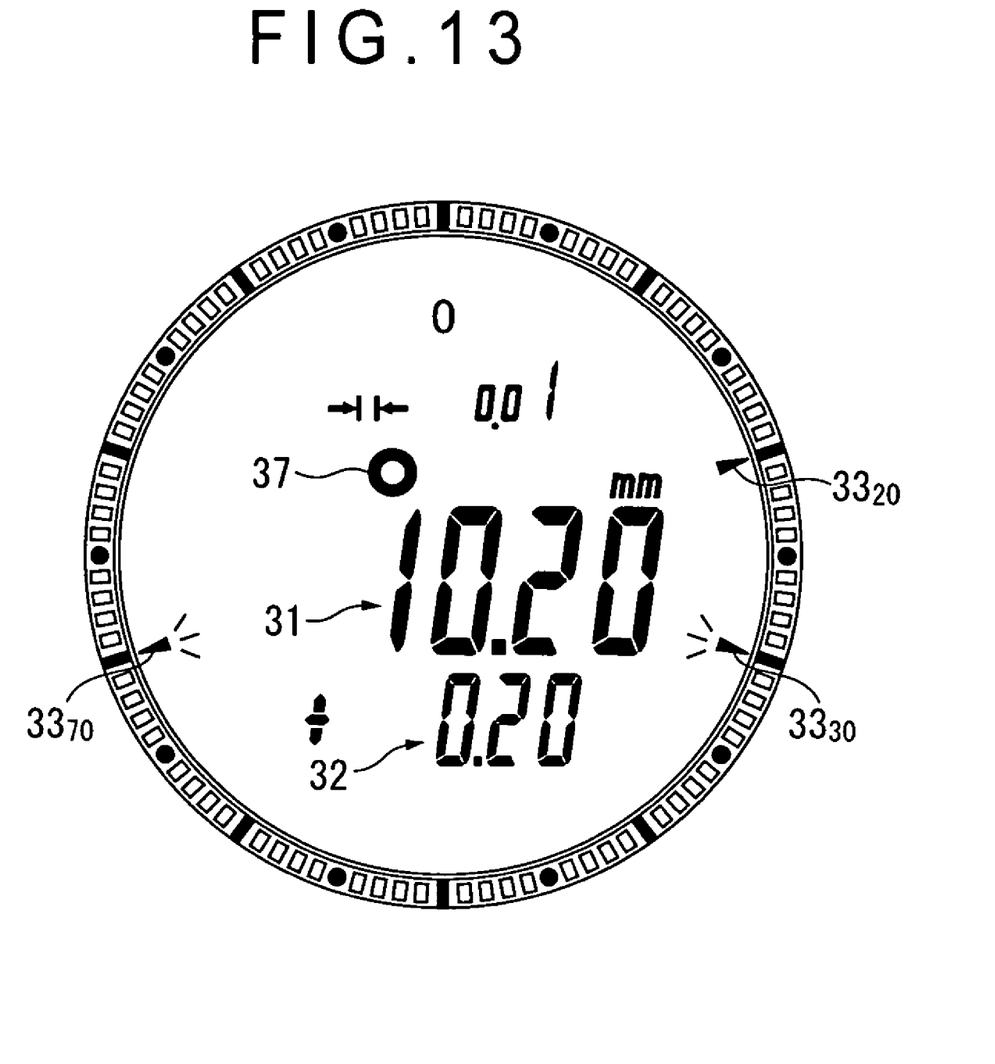
FIG. 13 illustrates the display device when a present measured value is within a tolerance range in the tolerance determination mode according to the exemplary embodiment.

In ST 26, the tolerance determination is made. In other words, it is determined whether or not the difference S is within the tolerance range. When the difference S is within the tolerance range, the process proceeds to ST 27 to blink an acceptance display segment 37 as shown in FIG. 13. When the difference S is not within the tolerance range, the process proceeds to ST 28 to check whether the difference S is smaller than the lower limit value. When the difference S is smaller than the lower limit value, the rejection display segment 38 is lighted in ST 29. When the difference S is not smaller than the lower limit value, the rejection display segment 39 is lighted in ST 30.

ADVANTAGES OF EXEMPLARY EMBODIMENTS

According to the exemplary embodiment, the measuring instrument has three modes, namely: the present value display mode for displaying the measured value on the digital display 31 and the analog display 33; the tolerance set mode for setting and storing the preset value, and the upper limit value and the lower limit value in the tolerance; and the tolerance determination mode for determining whether the measured value is between the upper limit value and the lower limit value in the tolerance and displaying the result. Thus, the respective above-described processes can be executed by switching between the modes.

In the present value display mode, the measured value is displayed as a numerical value on the digital display 31 while the last two digits of the measured value are displayed on the analog display 33. Since the last two digits that tend to instantly change are displayed on the analog display 33 in an analog manner, the measured value is easily readable.

In the tolerance set mode, when the set switch 28 is pressed, the measured values are inputted as the preset value, the upper limit value, and the lower limit value to be set as the preset value and the upper and lower limit values in the tolerance. Thus, the tolerance range can be arbitrarily set. At this time, the preset value, and the upper and lower limit values can be set only by pressing the set switch 28 under such a condition that the slider 21 is moved along the main scale 11 and an arbitrary preset value and upper and lower limit values are displayed on the displays 31 and 33. The preset value and the upper and lower limit values can be promptly and easily set without providing a dedicated switch for inputting the preset value and the upper and lower values.

In the tolerance determination mode, the display segment corresponding to the upper and lower limit values that indicate the tolerance range is blinked. Therefore, the tolerance range can be displayed such that the tolerance range display is distinguished from the point display of the measured value.

Also, the difference S between the present measured value X and the preset value Y is obtained, whether the difference S is within the analog display range that is wider than the tolerance range is determined, and then the display segment corresponding to the last two digits of the present measured value are lighted when the difference S is within the analog display range. Accordingly, when the difference between the preset value and the present measured value is within the analog display range, the display segment corresponding to the last two digits of the present measured value is lighted. Thus, a position of the present measured value relative to the tolerance range can be visually checked by the display segment of the analog display 33. Additionally, the display segment of the analog display 33 is not lighted until the difference between the preset value and the present measured value is within the analog display range. Thus, visibility of the analog display 33 can be enhanced and electric power consumption can be reduced.

Finally, it is checked whether the measured value is within the tolerance range. When the measured value is within the tolerance range, the acceptance display segment 37 is blinked. When the measured value is not within the tolerance range, the rejection display segments 38 and 39 are respectively blinked. Thus, a result can be easily confirmed by visually checking which display segment is blinked.

Modification 1

Although the invention is described with reference to a specific exemplary embodiment, the invention is not limited thereto and may include any modification or improvement made within a scope where an object of the present invention can be achieved.

Although the display segments are blinked to display the tolerance range according to the exemplary embodiment, the display segments may be lighted.

Although an encircling circumferential length of the analog display 33 indicates 1 mm according to the exemplary embodiment, the invention is not limited thereto. For example, the analog display 33 may be configured to have a display range indicating 1 mm in the encircling circumferential length when a present measured value is within a wider range than a tolerance range (between a lower limit value and an upper limit value), and to be automatically shifted to have another display range indicating 0.5 mm in the encircling circumferential length when a present measured value is within a narrower range than the tolerance range. The analog display 33 may be automatically shifted to have a different display range by a preset value or upper and lower limit values (tolerance range). In addition, users may arbitrarily set a display range of the analog display 33.

When the measured value is within the tolerance range in the tolerance determination mode, all consecutive display segments of the analog display 33 from a display segment corresponding to a lower limit value to a display segment corresponding to a measured value may be lighted. In contrast, all consecutive display segments of the analog display 33 from a display segment corresponding to an upper limit value to the display segment corresponding to the measured value may be lighted. This allows an acceptance display to be visually checked easily.

Also, the encoder 42 working as the detector is not limited to the electrostatic capacitance type. A photoelectric type or an electromagnetic type may be employed as long as a displacement of the movable member relative to the fixed member can be detected as an electric signal.

The priority application Number JP 2007-287563 upon which this patent application is based is hereby incorporated by reference.

What is claimed is:

1. A measuring instrument comprising:
   a detector that outputs a measured value as an electric signal;
   a digital display unit;
   an analog display unit in which a plurality of display segments are arranged at equal intervals in an encircling belt; and
   a display controller that displays the measured value detected by the detector on the digital display unit and the analog display unit,
   wherein the display controller includes:
   a tolerance range display unit that lights or blinks display segments corresponding to a preset tolerance range relative to a preset value;
   a first determiner that obtains a difference between a preset value and a present measured value, and determines whether the difference is within an analog display range wider than the tolerance range;
   a difference display unit that lights a display segment corresponding to last one or last two digits of the present measured value when the first determiner determines that the difference is within the analog display range;
   a second determiner that determines whether the difference is within the tolerance range; and
   an acceptance or rejection display unit that displays a result determined by the second determiner.

2. The measuring instrument according to claim 1, wherein the analog display range is set to correspond to one encircling circumferential length or several encircling circumferential lengths of the analog display unit.

3. The measuring instrument according to claim 1, wherein the analog display unit includes 100 display segments arranged at equal intervals on an encircling circumference thereof to display two digits after decimal point of the present measured value.

4. The measuring instrument according to claim 1, wherein the digital display unit includes a first digital display unit that displays the measured value as a numerical value and a second digital display unit that displays a difference between the present measured value and the preset value as a numerical value.

* * * * *